(12) United States Patent
Jeong et al.

(10) Patent No.: US 10,674,537 B2
(45) Date of Patent: *Jun. 2, 2020

(54) METHOD OF ACCESSING CHANNEL IN WIRELESS LOCAL AREA NETWORK SYSTEM

(71) Applicant: RED HAT, INC., Raleigh, NC (US)

(72) Inventors: Yang Seok Jeong, Seoul (KR); Joo Young Kim, Seoul (KR)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,798

(22) Filed: Jan. 26, 2018

(65) Prior Publication Data
US 2018/0152965 A1 May 31, 2018

Related U.S. Application Data

(63) Continuation of application No. 15/258,824, filed on Sep. 7, 2016, now Pat. No. 9,918,339, which is a
(Continued)

(30) Foreign Application Priority Data

Jun. 13, 2012 (KR) .................. 10-2012-0063376
Apr. 2, 2013 (KR) .................. 10-2013-0035521

(51) Int. Cl.
*H04W 74/04* (2009.01)
*H04W 52/02* (2009.01)
(Continued)

(52) U.S. Cl.
CPC .......... *H04W 74/04* (2013.01); *H04L 5/0055* (2013.01); *H04W 48/10* (2013.01);
(Continued)

(58) Field of Classification Search
None
See application file for complete search history.

(56) References Cited

U.S. PATENT DOCUMENTS 5,953,676 A * 9/1999 Berry .................. H04W 84/14
455/403
7,251,685 B1 7/2007 Yildiz
(Continued)

FOREIGN PATENT DOCUMENTS

JP 2006186560 A 7/2006
KR 10-0617731 B1 8/2006
(Continued)

OTHER PUBLICATIONS

Shoukang Zheng (12R) et al.; Supporting Low Power Operation; May 13, 2012; pp. 1-12; doc.: IEEE 802.11-12/0409r5.
(Continued)

*Primary Examiner* — Anh Vu H Ly
(74) *Attorney, Agent, or Firm* — Lowenstein Sandler LLP (57) ABSTRACT

A method of accessing a channel in a wireless LAN system is disclosed. A method of accessing a channel in a terminal includes receiving TIM information included in a beacon transmitted by an access point, determining a channel access slot allocated to the terminal based on the TIM information, transmitting a data transmission request to the access point in the channel access slot, and receiving data transmission slot allocation information corresponding to the data transmission request from the access point. Accordingly, a time slot can be prevented from unnecessarily wasting.

14 Claims, 8 Drawing Sheets

Related U.S. Application Data continuation of application No. 14/406,583, filed as application No. PCT/KR2013/005110 on Jun. 11, 2013, now Pat. No. 9,467,943.

(51) Int. Cl.

| | | |
|---|---|---|
| *H04L 5/00* | (2006.01) | |
| *H04W 48/10* | (2009.01) | |
| *H04W 72/04* | (2009.01) | |
| *H04W 84/12* | (2009.01) | |
| *H04W 88/02* | (2009.01) | |

(52) U.S. Cl.
CPC ... *H04W 52/0222* (2013.01); *H04W 72/0446* (2013.01); *H04W 84/12* (2013.01); *H04W 88/02* (2013.01); *Y02D 70/00* (2018.01); *Y02D 70/142* (2018.01); *Y02D 70/144* (2018.01); *Y02D 70/22* (2018.01); *Y02D 70/26* (2018.01)

(56) References Cited

U.S. PATENT DOCUMENTS

| | | | |
|---|---|---|---|
| 8,218,494 B2 | 7/2012 | Conway | |
| 9,467,943 B2 | 10/2016 | Jeong | |
| 9,918,339 B2* | 3/2018 | Jeong | H04W 52/0222 370/338 |
| 2004/0028071 A1* | 2/2004 | Gehring | H04J 3/1682 370/442 |
| 2005/0047386 A1 | 3/2005 | Yi | |
| 2005/0152324 A1 | 7/2005 | Benveniste | |
| 2007/0115972 A1 | 5/2007 | Jang et al. | |
| 2009/0257369 A1 | 10/2009 | Igarashi | |
| 2010/0309831 A1* | 12/2010 | Yeh | H04W 52/0216 370/311 |
| 2011/0003603 A1 | 1/2011 | Park et al. | |
| 2012/0188925 A1 | 7/2012 | Lee | |
| 2013/0128798 A1* | 5/2013 | Liu | H04W 48/12 370/312 |
| 2013/0201974 A1 | 8/2013 | Merlin | |
| 2013/0235720 A1 | 9/2013 | Wang | |
| 2014/0029499 A1 | 1/2014 | Chu | |
| 2014/0036757 A1 | 2/2014 | Kim et al. | |
| 2014/0071900 A1 | 3/2014 | Park | |
| 2015/0071262 A1 | 3/2015 | Doppler | |

FOREIGN PATENT DOCUMENTS

| | | |
|---|---|---|
| WO | 2008114427 A1 | 9/2008 |
| WO | 2011/065743 A2 | 6/2011 |
| WO | 2013122424 A1 | 8/2013 |

OTHER PUBLICATIONS

Minyoung Park (Intel Corp.) et al.; Uplink Channel Access; May 14, 2012; pp. 1-21; doc.: IEEE 802.11-12/0606r1.

Klaus Doppler (Nokia) "PS-Poll Immediate ACK Enhancements"; Mar. 12, 2012; pp. 1-9; doc.: IEEE 802.11-12/0327r0.

Youngho Seok, (LG Electronics) et al.,; Uplink Channel Access General Procedure; Jul. 12, 2012; pp. 1-19; doc.: IEEE 802.11-12/0831r0.

International Search Report of PCT/KR2013/005110 dated Oct. 21, 2013 [PCT/ISA/210].

Written Opinion of PCT/KR2013/005110 dated Oct. 21, 2013 [PCT/ISA/237].

* cited by examiner

METHOD OF ACCESSING CHANNEL IN WIRELESS LOCAL AREA NETWORK SYSTEM

This application is a continuation of application Ser. No. 15/258,824 (allowed), filed Sep. 7, 2016, which is a continuation of application Ser. No. 14/406,583, filed Dec. 9, 2014, now U.S. Pat. No. 9,467,943, which is a National Stage Application of PCT/KR2013/005110 filed Jun. 11, 2013 which claims the benefit of Korean Patent Application No. 10-2012-0063376, filed on Jun. 13, 2012 and Korean Patent Application No. 10-2013-0035521, filed Apr. 2, 2013. The entire disclosures of the prior applications are hereby incorporated by reference in their entireties.

TECHNICAL FIELD

The present invention relates to a channel access method, and more specifically, to a method of accessing a wireless medium channel between an access point and a non-AP station in a wireless LAN system.

BACKGROUND ART

With the development of information and communication technology, a variety of wireless communication technologies are developed. Among them, a wireless LAN (wireless local area network, WLAN) is technology for allowing the Internet to be wirelessly accessed in home, a company, or a specific service providing region using a portable terminal such as a personal digital assistant (PDA), a laptop computer, or a portable multimedia player (PMP) based on radio frequency technology.

A standard for the wireless LAN technology is developed as an IEEE (Institute of Electrical and Electronics Engineers) 802.11 standard. IEEE 802.11a provides a maximum PHY data rate of 54 Mbps using a 5 GHz unlicensed band. IEEE 802.11b provides a maximum PHY data rate of 11 Mbps by applying a direct sequence spread spectrum (DSSS) at 2.4 GHz. IEEE 802.11g provides a maximum PHY data rate of 54 Mbps by applying orthogonal frequency division multiplexing (OFDM) at 2.4 GHz. IEEE 802.11n provides a PHY data rate of 300 Mbps for two spatial streams by applying multiple input multiple output-OFDM (MIMO-OFDM). IEEE 802.11n supports a channel bandwidth up to 40 MHz and, in this case, provides data rate of 600 Mbps.

As the spread of such a wireless LAN is activated and applications using the wireless LAN are diversified, the need of new wireless LAN technology for supporting a throughput higher than data rate supported by the IEEE 802.11n is increasing. Very high throughput (VHT) wireless LAN technology is one IEEE 802.11 wireless LAN technology proposed to support data rate of 1 Gbps or more. Above all, IEEE 802.11ac is developed as a standard for providing very high throughput in a 5 GHz band, and IEEE 802.11ad is developed as a standard for providing very high throughput in a 60 GHz band.

In a system based on such wireless LAN technology, a non-AP station operating in a power save mode (PSM) transmits a PS (power save)-poll frame to an access point for reception of data buffered in the access point. In this case, when a plurality of PS-poll frames are transmitted at the same time, a channel access competition among non-AP stations and collision among the PS-poll frames occur. Accordingly, since the non-AP station must be continuously kept in an awake state or repeatedly perform retransmission of a PS-poll frame not transmitted due to the collision until data is successfully received, a large amount of power is consumed.

DISCLOSURE

Technical Problem

An object of the present invention for solving the aforementioned problems is to provide a method of accessing a channel in a station in order to access the channel based on scheduling information for a transmission period.

Another object of the present invention for solving the aforementioned problems is to provide a method of accessing a channel in an access point in order to access the channel based on scheduling information for a transmission period.

Still another object of the present invention for solving the aforementioned problems is to provide a method of allocating AID to a terminal during association procedure in order to access a channel based on scheduling information for a transmission period.

Technical Solution

According to an embodiment of the present invention for accomplishing the above object, a method of accessing a channel in a terminal includes: receiving TIM information included in a beacon transmitted by an access point; determining a channel access slot allocated to the terminal based on the TIM information; transmitting a data transmission request to the access point in the channel access slot; and receiving data transmission slot allocation information corresponding to the data transmission request from the access point.

Here, the terminal may determine the channel access slot allocated to the terminal based on a position of an AID of the terminal included in the TIM information.

Here, the data transmission request may be a PS-poll frame.

Here, the channel access slot may have a length corresponding to a sum of PS-poll frame transmission time, SIFS, and ACK reception time.

Here, the data transmission slot allocation information may be included in an ACK frame corresponding to the data transmission request and received.

Here, the method may further include receiving data corresponding to the data transmission request from the access point in the data transmission slot.

According to an embodiment of the present invention for accomplishing the other object, a method of accessing a channel in an access point includes: transmitting a beacon including TIM information for a terminal; receiving a data transmission request from the terminal in a channel access slot allocated to the terminal based on the TIM information; and transmitting data transmission slot allocation information allocated to the terminal to the terminal in response to the data transmission request.

Here, the channel access slot allocated to the terminal may be determined based on a position of an AID of the terminal included in the TIM information.

Here, the data transmission request may be a PS-poll frame.

Here, the channel access slot may have a length corresponding to a sum of PS-poll frame transmission time, SIFS, and ACK reception time.

Here, the data transmission slot allocation information may be included in an ACK frame corresponding to the data transmission request and transmitted.

Here, the method may further include transmitting data corresponding to the data transmission request to the terminal in the data transmission slot.

According to an embodiment of the present invention for accomplishing the still other object, a method includes: transmitting, by a terminal, an association request frame including information specifying a service type supported by the terminal to an access point; and receiving an association response frame including an AID allocated to the terminal based on the service type from the access point.

Here, the service type may include a low power consumption property service type.

Here, the low power consumption property service type may be a service type given to a low power sensor terminal.

Here, when the service type indicates a service type of a terminal having a low power consumption property, an AID allocated to the terminal in a TIM bitmap may be located earlier than an AID of a terminal having a normal power consumption property.

Advantageous Effects

According to the present invention, it is possible to prevent a time slot from unnecessarily wasting by separating a PS-poll (or trigger) frame transmission period and a data transmission period.

Further, it is possible to prevent unnecessary power consumption of a low power station by grouping stations according to power properties of the stations, allocating the AID (association ID), and allocating the time slot for the low power station earlier in terms of time.

DESCRIPTION OF DRAWINGS

These and other features, aspects, and advantages of preferred embodiments of the present invention will be more fully described in the following detailed description, taken accompanying drawings. In the drawings.

MODE FOR INVENTION

Various modifications may be made to the present invention and there are several embodiments. Specific embodiments will be illustrated in drawings and will be described in detail.

However, the present invention is not intended to be limited to the embodiments and should be construed as covering all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (i.e., between versus directly between, adjacent versus directly adjacent, etc.).

The terminology used herein is for the purpose of describing particular embodiments only and is not intended to be limiting of the invention. As used herein, the singular forms a, an, and the are intended to include the plural forms as well, unless the context clearly indicates otherwise. It will be further understood that the terms comprises, comprising, includes, and/or including, when used herein, specify the presence of stated features, integers, steps, operations, elements, components, and/or combinations thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in greater detail with reference to the accompanying drawings. To facilitate understanding of the present invention, like numbers refer to like elements throughout the description of the drawings, and description of the same elements will not be reiterated.

Throughout this disclosure, a station (STA) means any functional medium including a physical layer interface of medium access control (MAC) and a wireless medium conforming to regulations of an IEEE (Institute of Electrical and Electronics Engineers) 802.11 standard. The station (STA) may be classified into a station (STA) that is an access point (AP) and a station (STA) that is a non-access point (non-AP). The station (STA) that is the access point (AP) may be simply referred to as an access point (AP), and the station (STA) that is the non-access point (non-AP) may be simply referred to as a terminal.

The station (STA) includes a processor and a transceiver, and may further include a user interface and a display device. The processor means a unit designed to generate a frame to be transmitted over a wireless network and process a frame received over the wireless network, and performs several functions for controlling the station (STA). The transceiver means a unit functionally connected to the processor and designed to transmit or receive a frame over a wireless network for the station (STA).

The access point (AP) may refer to a centralized controller, a base station (BS), a node-B, an e-node-B, a BTS (base transceiver system), a site controller, or the like, and may include some or all functions thereof.

The terminal may refer to a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit, or the like, and may include some or all functions thereof.

Here, a desktop computer, a laptop computer, a tablet PC, a wireless phone, a mobile phone, a smartphone, an e-book reader, a PMP (Portable Multimedia Player), a portable gaming machine, a navigation device, a digital camera, a DMB (Digital Multimedia Broadcasting) player, a digital audio recorder, a digital audio player, a digital picture recorder, a digital picture player, a digital video recorder, a digital video player, or the like that is capable of communication may be used as the terminal.

Figure 1:
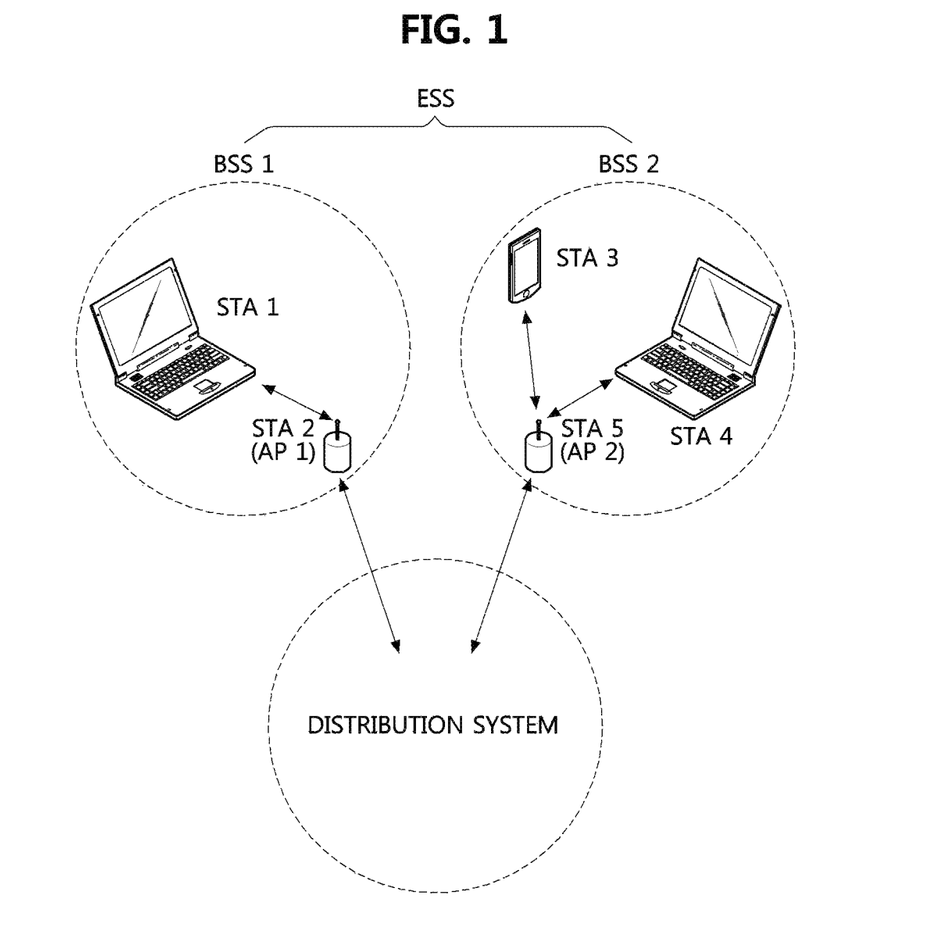
FIG. 1 is a conceptual diagram illustrating an embodiment of a configuration of an IEEE 802.11 wireless LAN system.

FIG. 1 is a conceptual diagram illustrating an embodiment of a configuration of an IEEE 802.11 wireless LAN system.

Referring to FIG. 1, an IEEE 802.11 wireless LAN system includes at least one basic service set (BSS). The BBS refers to a set of stations STA 1, STA 2 (AP 1), STA 3, STA 4, and STA 5 (AP 2) that can communicate with each other through successful synchronization, and is not a concept that means a specific area.

The BSS may be classified into an infrastructure BSS and an independent BSS (IBSS), and BSS 1 and BSS 2 refer to the infrastructure BSSs. BSS 1 may include the terminal (STA 1), the access point STA 2 (AP 1) that provides a distribution service, and a distribution system (DS) that associates a number of access points (STA 2 (AP 1) and STA 5 (AP 2)). In BSS 1, the access point (STA 2 (AP 1)) manages the terminal STA 1.

BSS 2 may include the terminals STA 3 and STA 4, the access point STA 5 (AP 2) that provides the distribution service, and the distribution system that associates a number of access points STA 2 (AP 1) and STA 5 (AP 2). In BSS 2, the access point STA 5 (AP 2) manages the terminals STA 3 and STA 4.

On the other hand, the independent BSS is a BSS operating in an ad-hoc mode. Since the IBSS does not include an access point, there is no entity (a centralized management entity) that performs a management function at a center. In other words, in IBSS, the terminals are managed in a distributed manner. In IBSS, all terminals may be mobile terminals and are not allowed to connect to the distribution system (DS), thereby constituting a self-contained network.

The access points STA 2 (AP 1) and STA 5 (AP 2) provide access to the distribution system (DS) through a wireless medium for the terminals (STA 1, STA 3, and STA 4) associated to the access points STA 2 (AP 1) and STA 5 (AP 2). Communication between the terminals STA 1, STA 3, and STA 4 in BSS 1 or BSS 2 is generally performed through the access points STA 2 (AP 1) and STA 5 (AP 2). However, when a direct link is established, direct communication between the terminals STA 1, STA 3, and STA 4 is possible.

A plurality of infrastructure BSSs may be interconnected via the distribution system (DS). The plurality of BSSs connected via the distribution system (DS) is referred to as an extended service set (ESS). The stations included in the ESS may communicate with each other, and a terminal within the ESS may move from one BSS to the other BSS while performing seamless communication.

The distribution system (DS) is a mechanism for one access point communicating with the other access point, in which the access point may transmit a frame for terminals associated with the BSS managed by the access point, or may transmit a frame for any terminal which has moved to the other BSS. Further, the access point may transmit or receive a frame to or from an external network such as a wire network. Such a distribution system (DS) is not necessarily a network, and a form thereof is not particularly limited as long as the distribution system (DS) can provide a predetermined distribution service defined in the IEEE 802.11 standard. For example, the distribution system may be a wireless network such as a mesh network or may be a physical structure associating access points with each other.

The channel access method according to an embodiment of the present invention that will be described below may be applied to the IEEE 802.11 wireless LAN system described above, and may also be applied to not only the IEEE 802.11 wireless LAN system but also various networks such as a WPAN (Wireless Personal Area Network) and a WBAN (Wireless Body Area Network).

Figure 2:
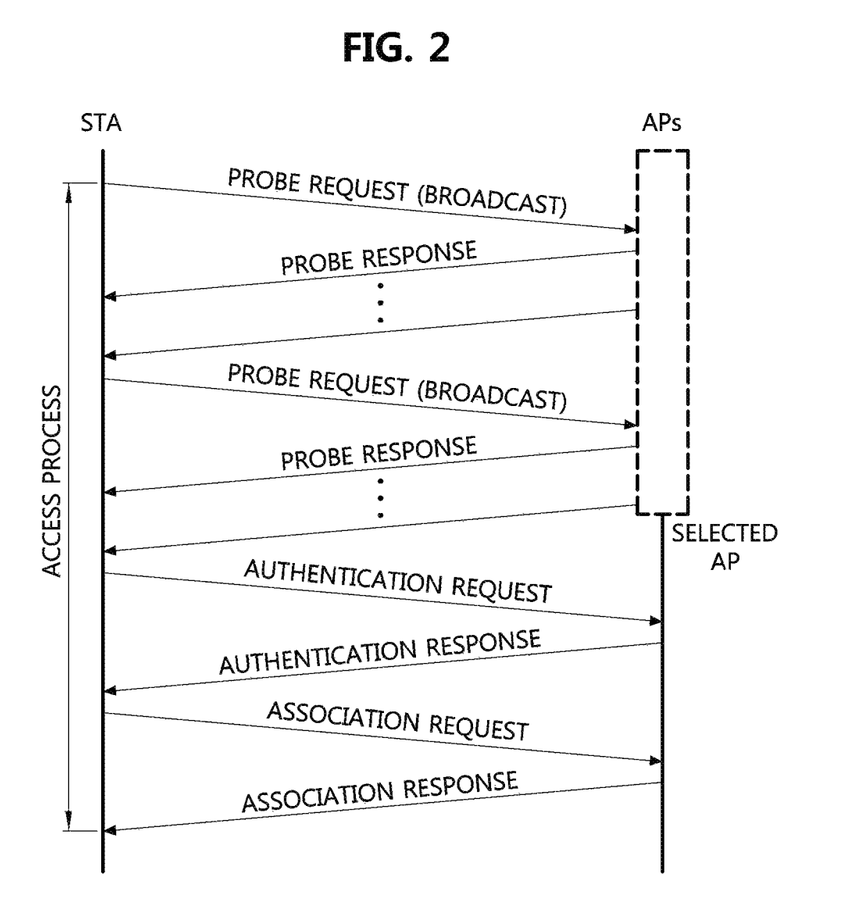
FIG. 2 is a conceptual diagram illustrating a process of a station scanning and associating with an infrastructure BSS.

FIG. 2 is a conceptual diagram illustrating a process of accessing a station in an infrastructure BSS.

In an infrastructure BSS, a terminal (STA) must first be associated with an access point (AP) in order to transmit or receive data.

Referring to FIG. 2, a process of accessing a terminal (STA) in an infrastructure BSS is greatly classified into (1) a step of probing an access point (AP), (2) a step for authentication with the probed access point (AP), and (3) a step for association with the authenticated access point (AP).

The terminal (STA) may first probe adjacent access points (APs) through a probing process. The probing process is classified into a passive scanning method and an active scanning method. The passive scanning method may be performed by overhearing a beacon transmitted by adjacent access points (APs). On the other hand, the active scanning method may be performed by broadcasting a probe request frame. The access point (AP) receiving the probe request frame may transmit a probe response frame corresponding to the probe request frame to the terminal (STA). The terminal (STA) may recognize presence of the adjacent access points (APs) by receiving the probe response frame.

Then, the terminal (STA) may select one proper access point (AP) among the plurality of authenticated access points (APs) and perform an authentication with the selected access point (AP). An authentication algorithm according to the IEEE 802.11 standard is classified into an open system algorithm for exchanging two authentication frames and a shared key algorithm for exchanging four authentication frames. Through a process of exchanging an authentication request frame and an authentication response frame based on such an authentication algorithm, the terminal (STA) may perform the authentication with the access point (AP).

Finally, the terminal (STA) performs an association process with the authenticated access point (AP). In other words, the terminal (STA) transmits an association request frame to the authenticated access point (AP), and the access point (AP) having received the association request frame transmits an association response frame corresponding to the association request frame to the terminal (STA). Thus, through a process of exchanging the association request frame and the association response frame, the terminal (STA) may perform the association process with the access point (AP).

Figure 3:
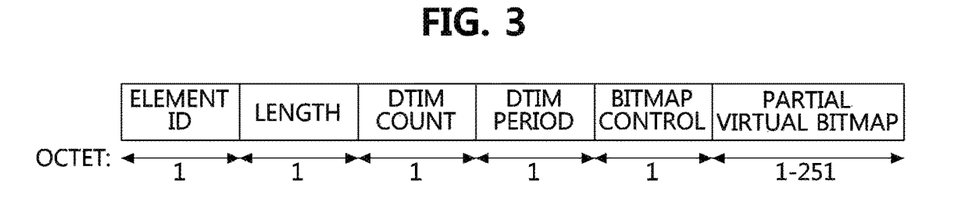
FIG. 3 is a block diagram illustrating an embodiment of format of a TIM included in a beacon.

FIG. 3 is a block diagram illustrating an embodiment of format of a TIM included in a beacon.

In an IEEE 802.11 wireless LAN system, when there is data to be transmitted to a terminal, an access point notifies the terminal of there being data to be transmitted using a TIM (traffic indication map) in a beacon (beacon frame) that is transmitted periodically.

Referring to FIG. 3, the TIM includes an element ID field, a length field, a DTIM (delivery traffic indication message) count field, a DTIM period field, a bitmap control field, and a partial virtual bitmap field.

The length field indicates a length of an information field. The DTIM count field indicates how many number of beacons are remained before the next DTIM appears. When the DTIM count is 0, this indicates that a current TIM corresponds to the DTIM. The DTIM count field consists of 1 octet. The DTIM period field indicates the number of beacon intervals between consecutive DTIMs. If all the TIMs are DTIMs, a value of the DTIM period field is 1. The DTIM period field consists of 1 octet.

The bitmap control field consists of 1 octet, and bit number 0 in the bitmap control field means a traffic indicator bit associated with an AID (association ID) 0. When such a bit is set to 1 and the value of the DTIM count field is 0, this indicates that at least one multicast or broadcast frame has been buffered in the access point. Other 7 bits of the bitmap control field form a bitmap offset.

The partial virtual bitmap field consists of 1 to 251 octets, and bit number N has a value between 0 and 2007. Each bit of the partial virtual bitmap field corresponds to whether the AP buffered any data for a specific terminal. When the AID of any terminal is N, bit number N of the partial virtual bitmap field is set to 0 when the data was buffered for any terminal does not exist, and bit number N of the partial virtual bitmap field is set to 1 when the data was buffered for any terminal exists.

Figure 4:
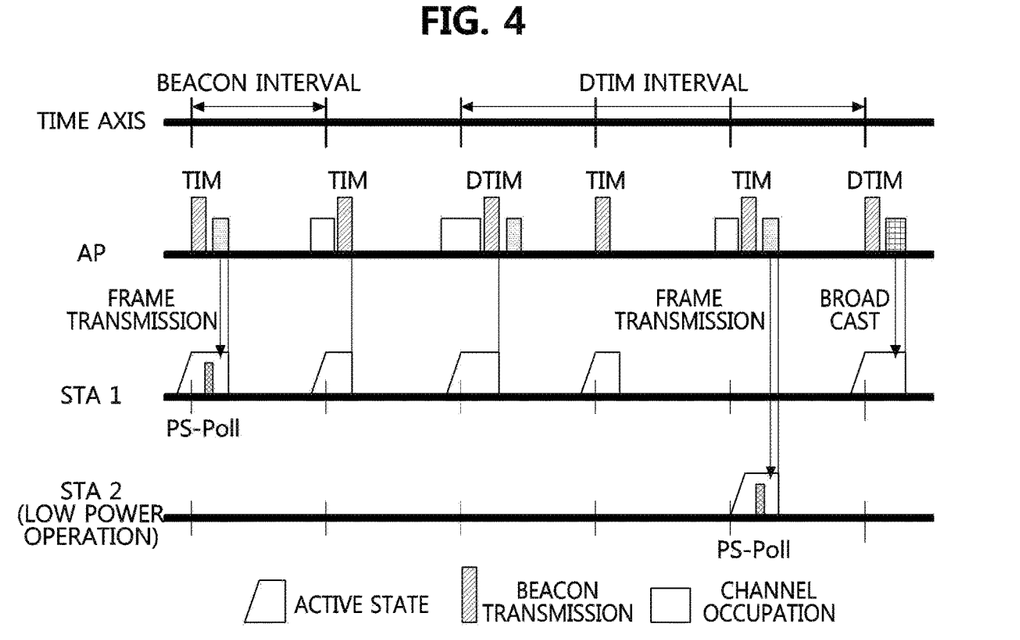
FIG. 4 is a conceptual diagram illustrating an embodiment of a data transmission process in an access point.

FIG. 4 is a conceptual diagram illustrating an embodiment of a data transmission process in the access point.

Referring to FIG. 4, the access point (AP) periodically broadcasts a beacon, and may broadcast a beacon including a DTIM at three beacon intervals. The terminal (STA 1 or STA 2) in a power save mode (PSM) periodically awakes, receives the beacon, and confirms the TIM or DTIM included in the beacon to determine whether data to be transmitted to the terminal has been buffered in the access point. In this case, when the buffered data exists, the terminal (STA 1 or STA 2) is kept in an awake state and receives the data from the access point (AP). When the buffered data does not exist, the terminal (STA 1 or STA 2) returns to a power save state (i.e., a doze state).

In other words, when the bit in the TIM corresponding to the AID of the terminal is set to 1, the terminal (STA 1 or STA 2) transmits a PS (Power Save)-poll frame (or trigger frame) indicating that the terminal awakes and is ready to receive data, to the access point (AP), and the access point (AP) may confirm that the terminal (STA 1 or STA 2) is ready to receive the data by receiving the PS-poll frame and transmit data or an ACK (acknowledgement) to the terminal (STA 1 or STA 2). When the access point (AP) has transmitted the ACK to the terminal (STA 1 or STA 2), the access point (AP) transmits data to the terminal (STA 1 or STA 2) in an appropriate time point. On the other hand, when the bit in the TIM corresponding to the AID of the terminal is set to 0, the terminal (STA 1 or STA 2) returns to the power-saving state.

In the TIM (or DTIM) included in the beacon, bits may be simultaneously set for a plurality of terminal AIDs. Accordingly, after the access point broadcasts the beacon, the plurality of terminals simultaneously transmit PS-poll to the access point when the bits corresponding to the AIDs of the terminals are set to 1. In this case, a wireless channel access competition for transmitting a PS-poll frame among the plurality of terminals is severe, and a collision occurs among the terminals due to a hidden node problem, which is a chronic problem of the wireless LAN system.

For example, such a phenomenon may often occur in a wireless LAN service that supports thousands of low power sensor terminals. In such a case, since the terminal must be continuously kept in an awake state or repeatedly perform retransmission of a PS-poll frame not transmitted due to a collision in order to complete the reception of data, a problem of power consumption may seriously appear.

Such a problem can be resolved by spreading channel access time points of the terminals over a certain period of time. In other words, the problem can be resolved by specifying time slots at a certain time interval in a predetermined period of time after a beacon transmission time point by the number of data transmission target terminals and allocating the specified time slot to each terminal.

Figure 5:
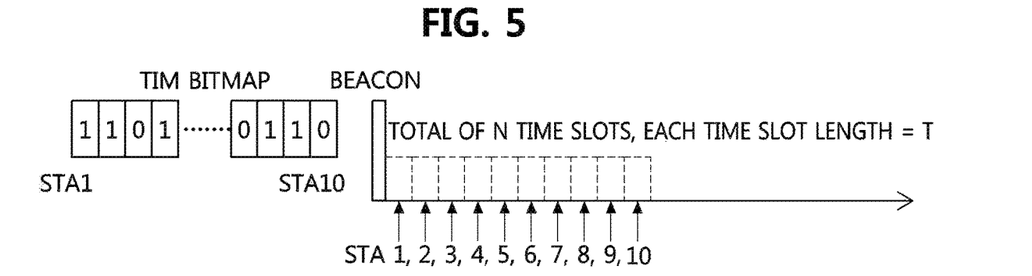
FIG. 5 is a conceptual diagram illustrating an embodiment of a method of allocating a time slot.

FIG. 5 is a conceptual diagram illustrating an embodiment of a method of allocating a time slot.

Referring to FIG. 5, an AID is set in the TIM (or DTIM) information (i.e., bitmap) in order from terminal 1 (STA 1) to terminal 10 (STA 10), and a time slot (T) may be allocated in this order. Therefore, the terminal may determine the time slot (T) allocated to the terminal in the order of the AID in the TIM (or DTIM) information (i.e., bitmap) included in the beacon. For example, when a bit corresponding to the AID of terminal 1 (STA 1) is located in a first position in the TIM (or DTIM) information (i.e., bitmap), terminal 1 (STA 1) may determine the time slot (T) allocated to the terminal to be a first slot in a predetermined period of time after a beacon transmission time point.

Here, one time slot (T) may have a length (e.g., about 20 to 40 ms) corresponding to "PS-poll (or trigger) frame transmission time +SIFS (Short InterFrame Space)+data reception time+SIFS+ACK transmission time". The length of the time slot (T) is not limited thereto and may have various lengths according to settings.

However, when a specific terminal does not transmit a PS-poll (or trigger) frame to the access point through the time slot (T) allocated to the terminal, the time slot (T) is wasted. Particularly, a terminal operating in a WNM power save mode may not transmit the PS-poll (or trigger) frame to the access point through the time slot (T) allocated to the terminal in a continuous DTIM period since the terminal does not listen to all DTIMs.

Further, a channel access time point of a time slot allocated to a terminal having a low priority (i.e., a time slot located later in terms of time) is affected by a time delay caused by, for example, failure for data transmission of a terminal allocated a time slot having a high priority (a time slot located earlier in terms of time). Therefore, when a low power terminal is allocated a time slot having a low priority (a time slot located backward in terms of time), the low power terminal must awake unnecessarily for a long time, which increases power consumption.

Figure 6:
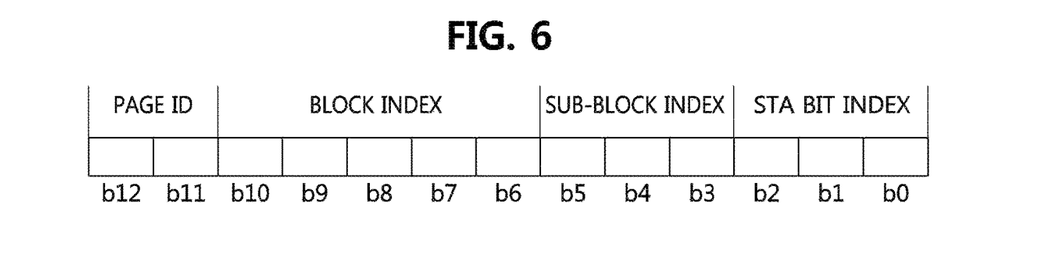
FIG. 6 is a block diagram illustrating an embodiment of an AID structure.
Figure 7:
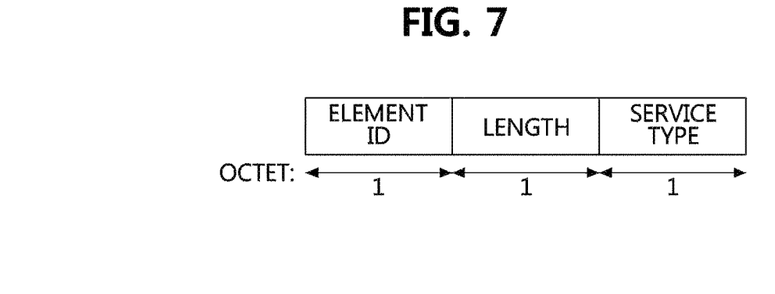
FIG. 7 is a block diagram illustrating an embodiment of a frame structure for specifying a service type of a station.

FIG. 6 is a block diagram illustrating an embodiment of a structure of an AID, and FIG. 7 is a block diagram illustrating an embodiment of a frame structure for specifying a service type of the terminal.

When a large number of terminals serviced by one access point exist and may be grouped according to a similar property, the access point may group and manage AIDs of the terminals.

Referring to FIG. 6, the AID structure includes a page ID field, a block index field, a sub-block index field, and an STA bit index field. In other words, the access point may manage the AID using a group layered in units of page/block/sub-block.

Referring to FIG. 7, the frame for specifying a service type of the terminal may include an element ID field, a length field, and a service type field. The terminal may specify a service type supported by the terminal through the service type field. The service type may include a low power consumption property service type, a service type having a channel access priority, and a general service type. The low power consumption property service type may mean a service type given to a low power sensor terminal (or low-capacity sensor terminal), the service type having a channel access priority may mean a service type given to a terminal having a priority according to a previously defined criterion, and the general service type may mean a service type given to a terminal having a normal power consumption property.

The terminal having specified the service type supported by the terminal may transmit an association request frame (see FIG. 2) including information of the specified service type to the access point.

The access point having received the association request frame may allocate the AID of the terminal based on the service type. For example, when the service type is the low power consumption property service type, the access point may set the AID of the terminal having a low power consumption property to be located earlier in the TIM bitmap than the AID of the terminal having a normal power consumption property. Further, in the hierarchical AID structure, the access point may define a block index corresponding to the terminal having a low power consumption property as a low power block ID, and set the low power block ID to have a value smaller than the block ID of the terminal having a normal power consumption property.

After having allocated the AID of the terminal based on the service type, the access point may transmit an association response frame (see FIG. 2) including the allocated AID to the terminal.

Figure 8:
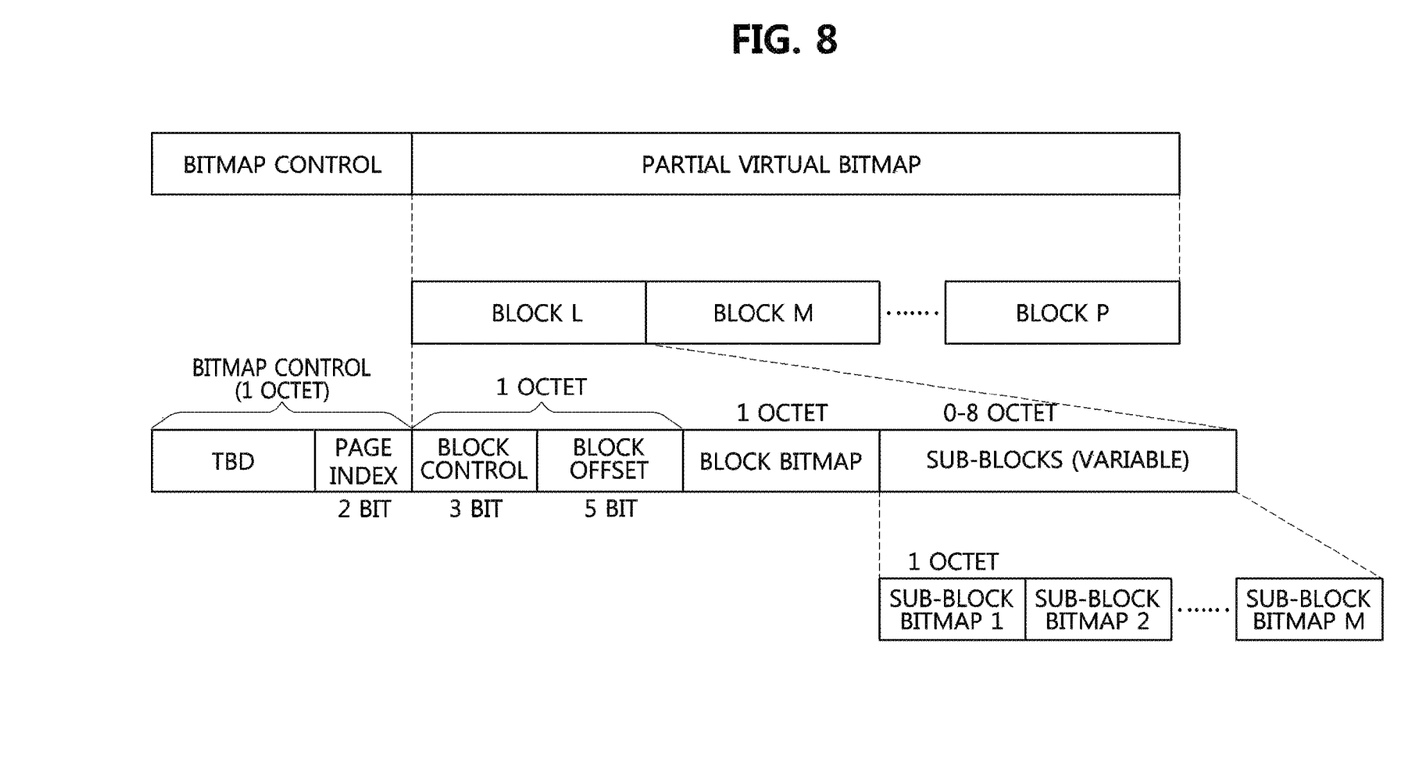
FIG. 8 is a conceptual diagram illustrating an embodiment of a structure of a TIM encoded in units of blocks.

FIG. 8 is a conceptual diagram illustrating an embodiment of a structure of the TIM encoded in units of blocks.

Referring to FIG. 8, a partial virtual bitmap field includes at least one block (block L, block M, . . . , block P) field. One block field includes a block control field, a block offset field, a block bitmap field, and a sub-block field having various sizes. The sub-block field includes at least one sub-block bitmap (sub-block bitmap1, sub-block bitmap2, . . . , sub-block bitmap M) field.

The block control field indicates a TIM encoding mode (i.e., a block bitmap mode, a single AID mode, an OLB (offset +length +bitmap) mode, or an inverse mode). The block offset field indicates an offset value of an encoded block. The block bitmap field indicates a bitmap indicating a sub-block in which an AID bit is set among sub-blocks in the block indicated by the block offset. The sub-block field indicates a bitmap for an AID in the sub-block.

Figure 9:
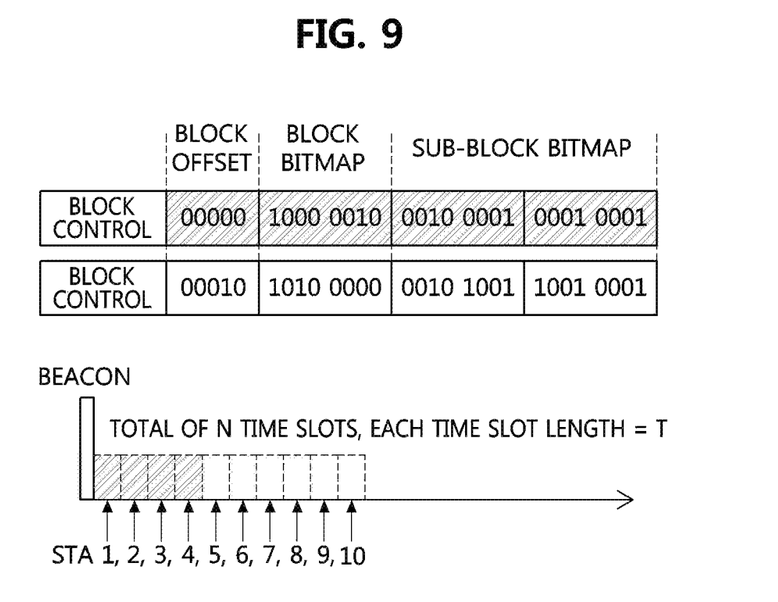
FIG. 9 is a conceptual diagram illustrating another embodiment of a method of allocating a time slot.

FIG. 9 is a conceptual diagram illustrating another embodiment of a method of allocating a time slot.

Referring to FIG. 9, when data to be transmitted to a terminal exists, the access point may allocate a time slot (T) for the terminal from a time point after having transmitted the beacon. Here, a block offset 0 indicates a terminal having a low power consumption property, and terminals having a low power consumption property include terminal 1 (STA 1), terminal 2 (STA 2), terminal 3 (STA 3), and terminal 4 (STA 4). A block offset 2 indicates a terminal having a normal power consumption property, and terminals having a normal power consumption property include terminal 5 (STA 5), terminal 6 (STA 6), terminal 7 (STA 7), terminal 8 (STA 8), terminal 9 (STA 9), and terminal 10 (STA 10).

The access point may allocate time slot (T) so that the time slot (T) for the terminals (STA 1, STA 2, STA 3, and STA 4) having a low power consumption property is earlier in terms of time than the time slot (T) for terminals (STA 5, STA 6, STA 7, STA 8, STA 9, and STA 10) having a normal power consumption property. In other words, the access point may first allocate the time slot (T) for the terminals (STA 1, STA 2, STA 3, and STA 4) having a low power consumption property in a predetermined time period after having transmitted the beacon and then may allocate the time slot (T) for the terminals (STA 5, STA 6, STA 7, STA 8, STA 9, and STA 10) having a normal power consumption property.

Here, one time slot (T) may have a length corresponding to "PS-poll (or trigger) frame transmission time+SIFS+data reception time+SIFS+ACK transmission time". The length of the time slot (T) is not limited thereto and may have various lengths according to settings.

Figure 10:
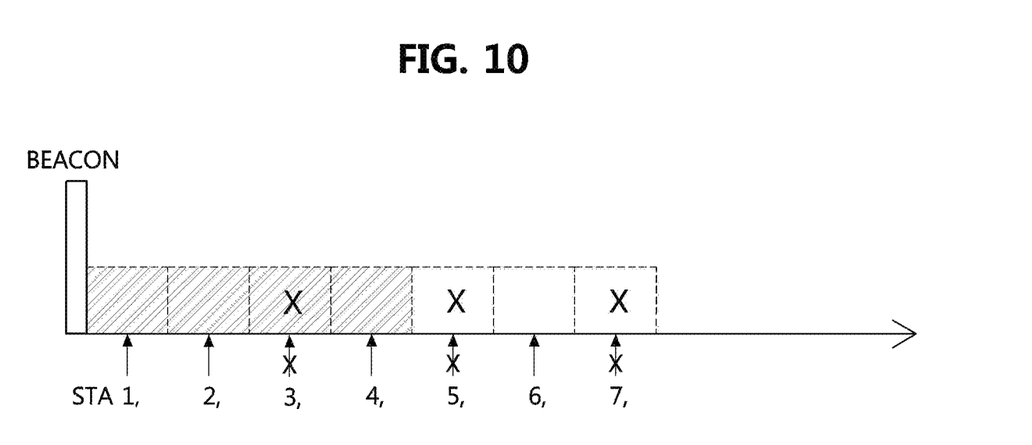
FIG. 10 is a conceptual diagram illustrating an embodiment in which a time slot wastes.

FIG. 10 is a conceptual diagram illustrating an embodiment in which the time slot wastes.

Referring to FIG. 10, In an environment in which the time slot is allocated as in FIG. 9 described above, since a terminal operating in a WNM power save mode and a terminal having a long listen interval do not watch all TIM (or DTIM), the terminals may not transmit a PS-poll (or trigger) frame to the access point through time slots allocated to the terminals in a continuous TIM(or DTIM) period.

Here, terminal 1 (STA 1), terminal 2 (STA 2), terminal 3 (STA 3), and terminal 4 (STA 4) refer to terminals having a low power consumption property, and terminal 5 (STA 5), terminal 6 (STA 6), and terminal 7 (STA 7) refer to terminals having a normal power consumption property. Terminal 1 (STA 1), terminal 2 (STA 2), terminal 4 (STA 4), and terminal 6 (STA 6) transmit a PS-poll (or trigger) frame to the access point through time slots allocated to the terminals and receive data according to the transmission from the access point. On the other hand, terminal 3 (STA 3), terminal 5 (STA 5), and terminal 7 (STA 7) do not use the time slots allocated to the terminals, and then the time slots are being wasted.

Figure 11:
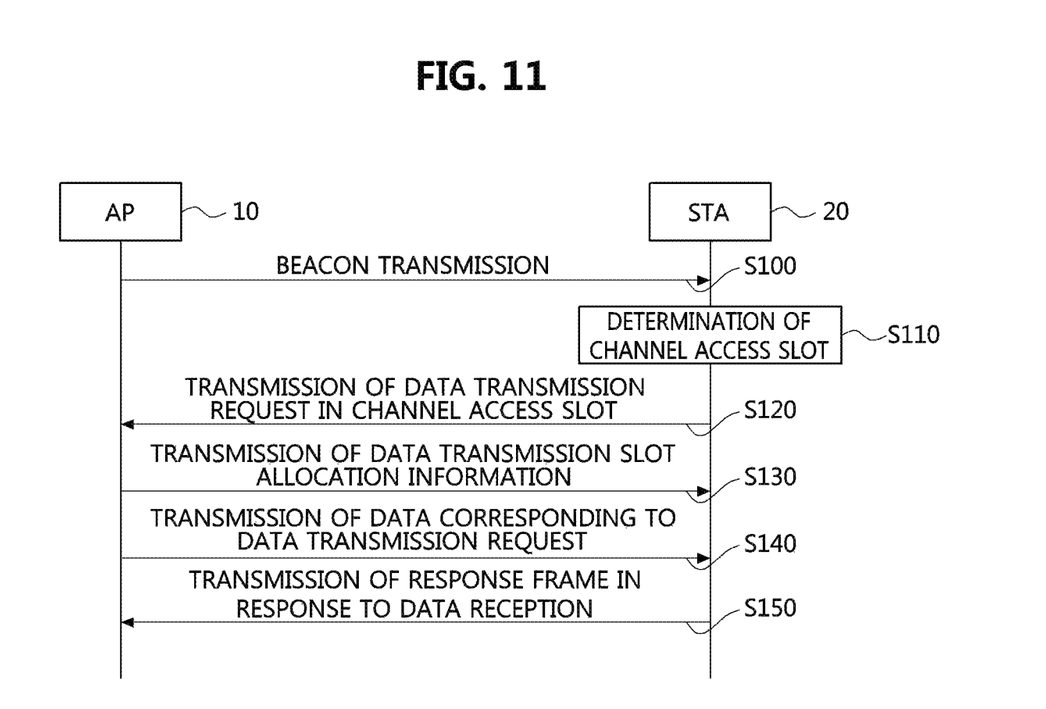
FIG. 11 is a flowchart illustrating a channel access method according to an embodiment of the present invention.

FIG. 11 is a flow diagram illustrating a channel access method according to an embodiment of the present invention.

Referring to FIG. 11, in the channel access method, on an access point 10 side, the access point 10 may transmit a beacon including TIM (or DTIM) information for a terminal 20 (S100), receive a data transmission request from the terminal 20 through a channel access slot allocated to the terminal 20 based on the TIM (or DTIM) information (S120), and transmit allocation information of a data transmission slot allocated to the terminal 20 to the terminal 20 in response to the data transmission request (S130). Further, the access point 10 may transmit data corresponding to the data transmission request to the terminal 20 through the data transmission slot (S140) and receive a response frame according to the data transmission from the terminal 20 (S150).

In the channel access method, on the terminal 20 side, the terminal 20 may receive the TIM (or DTIM) information included in the beacon transmitted by the access point 10 (S100), determine the channel access slot allocated to the terminal based on the TIM (or DTIM) information (S110), transmit the data transmission request to the access point 10 through the channel access slot (S120), and receive data transmission slot allocation information corresponding to the data transmission request from the access point 10 (S130). Further, the terminal 20 may receive the data corresponding to the data transmission request from the access point 10 through the data transmission slot (S140) and transmit a response frame according to the data reception to the access point 10 (S150).

In step S100, the access point 10 may broadcast the beacon including the TIM (or DTIM) information (i.e., bitmap) for the terminal 20, and the terminal 20 may receive the beacon transmitted from the access point 10. The access point 10 may set the TIM (or DTIM) information so that the AID of the terminal having a low power consumption property has a value smaller than the AID of the terminal having a normal power consumption property. Further, the access point 10 may transmit length information of the channel access slot to the terminal 20 through the beacon or may transmit the length information of the channel access slot to the terminal 20 at the time of association (or reassociation) of the terminal 20 (e.g., may transmit the length information of the channel access slot to the terminal 20 through the association response frame).

Here, the channel access slot may have a length (a length in which the PS-poll (or trigger) frame can be transmitted) corresponding to "PS-poll (or trigger) frame transmission time+SIFS+ACK reception time". The length of the channel access slot is not limited thereto and may have any length according to settings.

In step S110, the terminal 20 may determine the channel access slot allocated to the terminal based on the TIM (or DTIM) information received from the access point 10. For example, when a bit corresponding to the AID of the terminal 20 is set to 1 in the TIM (or DTIM) information and a position of the bit corresponding to the AID of the terminal among bits set to 1 in the TIM (or DTIM) information is a first position, the terminal 20 may determine a first slot in the channel access period to be a slot allocated to the terminal. In other words, the terminal 20 may acquire time information of the channel access slot allocated to the terminal based on the position of the channel access slot allocated to the terminal in the channel access period and the length information of the channel access slot. Here, the channel access period may include at least one channel access slot, and a concrete description of the channel access period will be described below.

Further, the access point 10 may determine a slot allocated to the terminal 20 in the channel access period using the same method as described above.

In step S120, the terminal 20 may transmit the data transmission request to the access point 10 through the channel access slot allocated to the terminal, and the access point 10 may receive the data transmission request transmitted through the channel access slot. Here, the data transmission request may mean the PS-poll (or trigger) frame.

In step S130, the access point 10 may transmit allocation information of the data transmission slot allocated to the terminal 20 to the terminal 20 through the channel access slot in response to the data transmission request, and the terminal 20 may receive the data transmission slot allocation information transmitted through the channel access slot. In this case, the access point 10 may transmit the data transmission slot allocation information to the terminal 20 through an ACK frame (i.e., an ACK frame including the data transmission slot allocation information) corresponding to the data transmission request.

The data transmission slot allocation information may include an order of the data transmission slot allocated to the terminal in the data transmission period, and may further include information of a length of the data transmission slot. Further, the access point 10 may transmit the information of the length of the data transmission slot to the terminal 20 through the beacon or may transmit the information of the length of the data transmission slot to the terminal 20 at the time of association (or reassociation) of the terminal 20 (e.g., may transmit the information of the length of the data transmission slot to the terminal 20 through an association response frame).

Here, the data transmission period may include at least one data transmission slot, and a concrete description of the data transmission period will be described below. The data transmission slot may have a length (a length in which data can be received) corresponding to "data reception time+ SIFS+ACK transmission time". The length of the data transmission slot is not limited thereto and may have any length according to settings.

In step S140, the access point 10 may transmit data according to the data transmission request to the terminal 20 through the data transmission slot, and the terminal 20 may receive the data transmitted through the data transmission slot. For example, when a first data transmission slot in the data transmission period has been allocated to the terminal 20, the access point 10 may transmit the data according to the data transmission request to the terminal 20 through the first data transmission slot in the data transmission period, and the terminal 20 may receive the data transmitted through the first data transmission slot in the data transmission period.

In step S150, the terminal 20 may transmit a response frame according to the reception of the data to the access point 10 through the data transmission slot allocated to the terminal, and the access point 10 may receive the response frame transmitted through the data transmission slot.

For example, when the first data transmission slot in the data transmission period has been allocated to the terminal 20, the terminal 20 may transmit the response frame according to the reception of the data to the access point 10 through the first data transmission slot in the data transmission period, and the access point 10 may receive the response frame transmitted through the first data transmission slot in the data transmission period.

Here, the response frame according to the reception of the data may mean an ACK frame.

Figure 12:
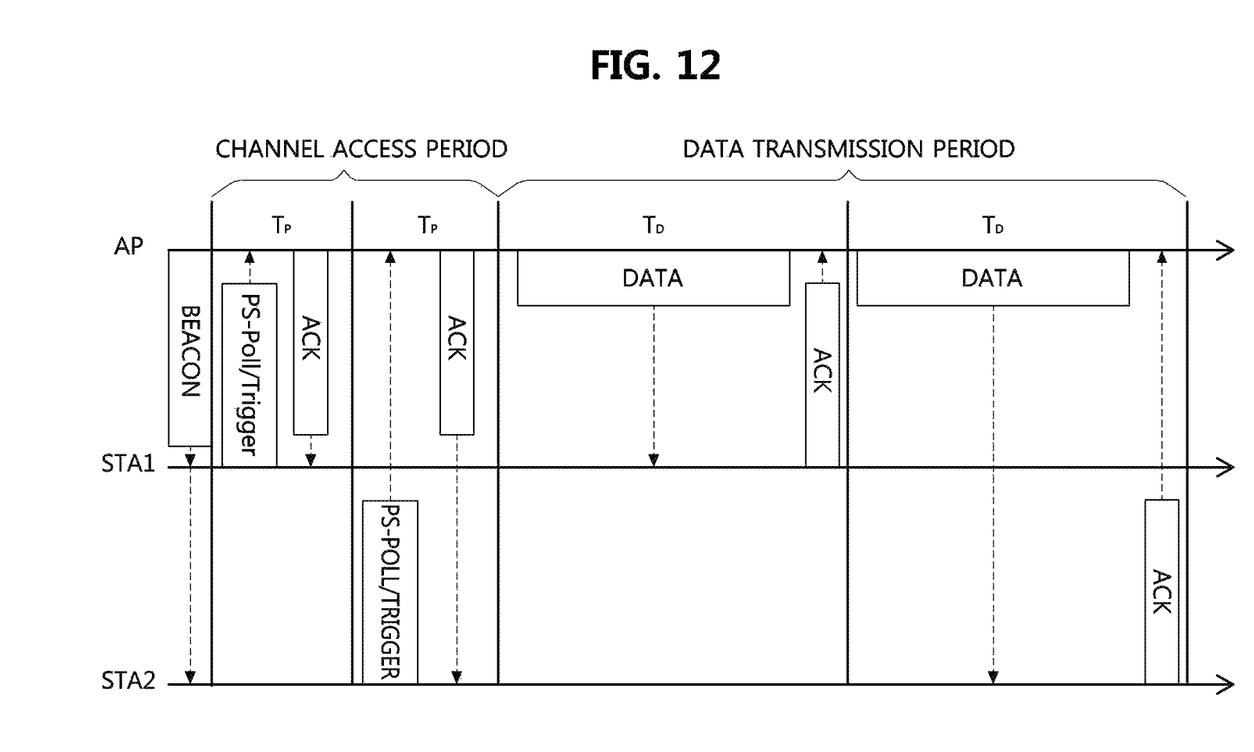
FIG. 12 is a conceptual diagram illustrating an embodiment of a channel access method.

FIG. 12 is a conceptual diagram illustrating an embodiment of the channel access method.

Referring to FIG. 12, a time period from a time point at which a beacon has been transmitted to a time point at which a next beacon is transmitted may be divided into a channel access period and a data transmission period. The channel access period is a period for confirming whether the terminal is ready to receive data (i.e., the terminal awakes) and may include at least one channel access slot (TP). The channel access slot (TP) may be allocated to at least one terminal, and the channel access slot (TP) may have a length corresponding to "PS-Poll (or trigger) frame transmission time+SIFS+ACK reception time".

The data transmission period is a period for transmitting data to a terminal ready to receive the data and may include at least one data transmission slot (TD). The data transmission slot (TD) may be allocated to one terminal, and the data transmission slot (TD) may have a length corresponding to "data reception time+SIFS+ACK transmission time".

The access point (AP) may broadcast the beacon including the TIM (or DITM) information, and the terminal (STA 1 or STA 2) may receive the beacon transmitted by the access point (AP).

When the bit corresponding to the AID of the terminal in the TIM (or DTIM) information is set to 1 and a position of the bit corresponding to the AID of the terminal among bits set to 1 in the TIM (or DTIM) information is a first position, Terminal 1 (STA 1) may determine a first slot in the channel access period to be a slot allocated to the terminal. Accordingly, terminal 1 (STA 1) may transmit a PS-poll (or trigger) frame to the access point (AP) through the first channel access slot (TP) in the channel access period and may receive the ACK frame according to the transmission of the PS-poll (or trigger) frame from the access point (AP) through the first channel access slot (TP).

When the bit corresponding to the AID of the terminal in the TIM (or DTIM) information is set to 1 and a position of the bit corresponding to the AID of the terminal among bits set to 1 in the TIM (or DTIM) information is a second position, Terminal 2 (STA 2) may determine a second slot in the channel access period to be a slot allocated to the terminal. Accordingly, terminal 2 (STA 2) may transmit a PS-poll (or trigger) frame to the access point (AP) through the second channel access slot (TP) in the channel access period and may receive the ACK frame according to the transmission of the PS-poll (or trigger) frame from the access point (AP) through the second channel access slot (TP).

When transmitting an ACK frame corresponding to the data transmission request (i.e., corresponding to the transmission of the PS-poll (or the trigger) frame), the access point (AP) may transmit the ACK frame including the data transmission slot allocation information to each terminal (STA 1 or STA 2).

When the data transmission slot allocation information included in the ACK frame indicates that the first data transmission slot (TD) in the data transmission period has been allocated, terminal 1 (STA 1) may receive the data from the access point (AP) through the first data transmission slot (TD) and may transmit the response frame (i.e., the ACK frame) according to the reception of the data to the access point (AP) through the first data transmission slot (TD).

When the data transmission slot allocation information included in the ACK frame indicates that the second data transmission slot (TD) in the data transmission period has been allocated, terminal 2 (STA 2) may receive the data from the access point (AP) through the second data transmission slot (TD) and may transmit the response frame (i.e., the ACK frame) according to the reception of the data to the access point (AP) through the second data transmission slot (TD).

Figure 13:
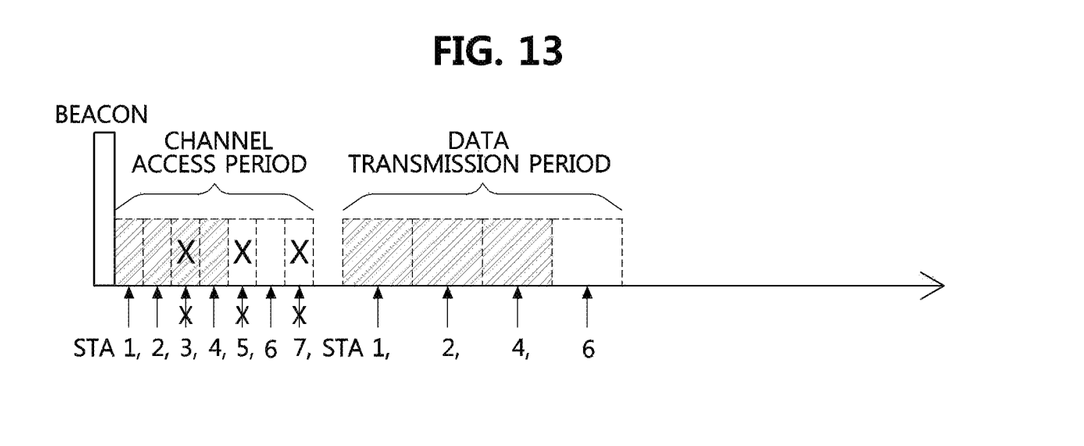
FIG. 13 is a conceptual diagram illustrating an embodiment of slot allocation according to the channel access method.

FIG. 13 is a conceptual diagram illustrating an embodiment of slot allocation according to a channel access method.

Referring to FIG. 13, when terminals (STA 1, STA 2, STA 3, and STA 4) having a low power consumption property and terminals (STA 5, STA 6, and STA 7) having a normal power consumption property exist, the access point may first allocate a channel access slot for the terminals (STA 1, STA 2, STA 3, and STA 4) having a low power consumption property in the channel access period and then allocate a channel access slot for terminals (STA 5, STA 6, and STA 7) having a normal power consumption property. In this case, the channel access slot may be allocated based on the position of the bit corresponding to the AID of each terminal in the TIM (or DTIM) information of the beacon.

Here, the channel access slot may have a length corresponding to "PS-poll (or trigger) frame transmission time+SIFS+ACK reception time". The length of the channel access slot is not limited thereto and may have any length according to settings.

Specifically, terminal 1 (STA 1) may transmit the PS-poll (or trigger) frame to the access point through the first channel access slot in the channel access period, and terminal 2 (STA 2) may transmit the PS-poll (or trigger) frame to the access point through the second channel access slot in the channel access period. Similarly, terminal 3 (STA 3) may transmit the PS-poll (or trigger) frame to the access point through a third channel access slot, terminal 4 (STA 4) may transmit the PS-poll (or trigger) frame to the access point through a fourth channel access slot, terminal 5 (STA 5) may transmit the PS-poll (or trigger) frame to the access point through a fifth channel access slot, terminal 6 (STA 6) may transmit the PS-poll (or trigger) frame to the access point through a sixth channel access slot, and terminal 7 (STA 7) may transmit the PS-poll (or trigger) frame to the access point through a seventh channel access slot.

The access point having received the PS-poll (or trigger) frame from each terminal may transmit the ACK frame corresponding to the PS-poll (or trigger) frame to the terminal through the channel access slot, and the ACK frame includes allocation information of the data transmission slot for the terminal. The access point may first allocate the data transmission slot for the terminals (STA 1, STA 2, and STA 4) having a low power consumption property in the data transmission period and then allocate the data transmission slot for the terminal (STA 6) having a normal power consumption property.

In other words, the access point may transmit the data transmission slot allocation information indicating that the first data transmission slot in the data transmission period is allocated to terminal 1 (STA 1) to terminal 1 (SAT 1) through the ACK frame, may transmit the data transmission slot allocation information indicating that the second data transmission slot in the data transmission period is allocated to terminal 2 (STA 2) to terminal 2 (STA 2) through the ACK frame, may transmit the data transmission slot allocation information indicating that the third data transmission slot in the data transmission period is allocated to terminal 4 (STA 4) to terminal 4 (SAT 4) through the ACK frame, and may transmit the data transmission slot allocation information indicating that the fourth data transmission slot in the data transmission period is allocated to terminal 6 (STA 6) to terminal 6 (SAT 6) through the ACK frame. In this case, since terminal 3 (STA 3), terminal 5 (STA 5), and terminal 7 (STA 7) have not transmitted the PS-poll (or trigger) frame to the access point, the access point does not transmit allocation information of the data transmission slot for terminal 3 (STA 3), terminal 5 (STA 5), and terminal 7 (STA 7).

Here, the data transmission slot may have a length corresponding to "data reception time+SIFS+ACK transmission time". The length of the data transmission slot is not limited thereto and may have various lengths according to settings.

After the channel access period, terminal 1 (STA 1) receives the data from the access point through the first data transmission slot in the data transmission period based on the data transmission slot allocation information and transmits an ACK frame according to the reception of the data to the access point. Terminal 2 (STA 2) receives the data from the access point through the second data transmission slot in the data transmission period based on the data transmission slot allocation information and transmits an ACK frame according to the reception of the data to the access point. Terminal 4 (STA 4) receives the data from the access point through the third data transmission slot in the data transmission period based on the data transmission slot allocation information and transmits an ACK frame according to the reception of the data to the access point. Terminal 6 (STA 6) receives the data from the access point through the fourth data transmission slot in the data transmission period based on the data transmission slot allocation information and transmits an ACK frame according to the reception of the data to the access point.

Figure 14:
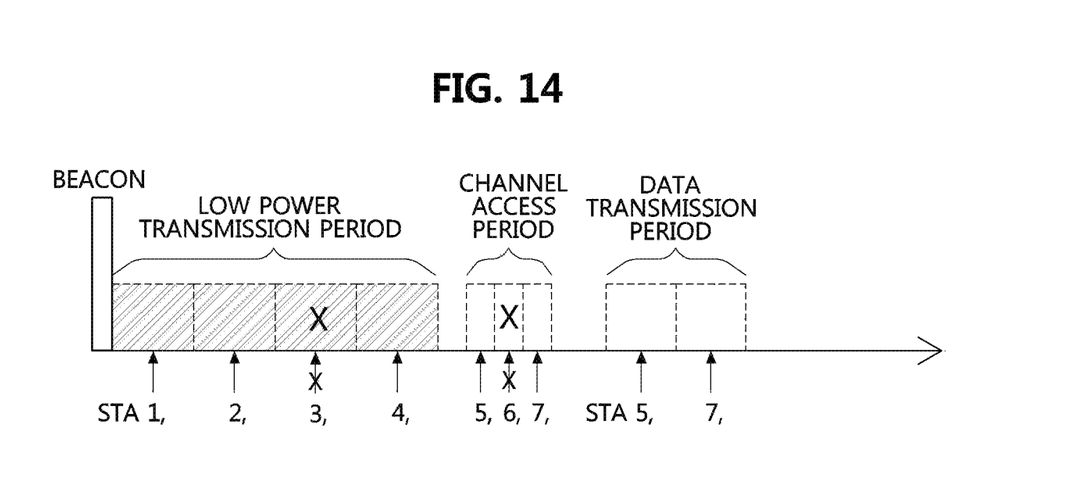
FIG. 14 is a conceptual diagram illustrating another embodiment of slot allocation according to the channel access method.

FIG. 14 is a conceptual diagram illustrating another embodiment of slot allocation according to the channel access method.

Referring to FIG. 14, when terminals (STA 1, STA 2, STA 3, and STA 4) having a low power consumption property and terminals (STA 5, STA 6, and STA 7) having a normal power consumption property exist, the access point may allocate a low power transmission slot for the terminals (STA 1, STA 2, STA 3, and STA 4) having a low power consumption property in a low power transmission period and then sequentially allocate a channel access slot and a data transmission slot for the terminals (STA 5, STA 6, and STA 7) having a normal power consumption property.

In this case, the low power transmission slot and the channel access slot may be set based on the position of the bit corresponding to the AID of each terminal in the TIM (or DTIM) information of the beacon, and the data transmission slot may be set based on the data transmission slot allocation information transmitted by the access point according to the reception of the PS-poll (or trigger) frame.

Here, the low power transmission slot may have a length corresponding to "PS-poll (or trigger) frame transmission time+SIFS+data reception time+SIFS+ACK transmission time". The length of the low power transmission slot is not limited thereto and may have various lengths according to settings.

Specifically, terminal 1 (STA 1) transmits a PS-poll (or trigger) frame to the access point through the first low power transmission slot in the low power transmission period, receives data according to the transmission of the PS-poll (or trigger) frame from the access point, and transmits a response (i.e., ACK) frame according to the reception of the data to the access point. Terminal 2 (STA 2) transmits a PS-poll (or trigger) frame to the access point through the second low power transmission slot in the low power transmission period, receives data according to the transmission of the PS-poll (or trigger) frame from the access point, and transmits a response (i.e., ACK) frame according to the reception of the data to the access point.

Since terminal 3 (STA 3) has not transmitted the PS-poll (or trigger) frame to the access point through the third low power transmission slot in the low power transmission period, the access point does not transmit data for terminal 3 (STA 3). Terminal 4 (STA 4) transmits a PS-poll (or trigger) frame to the access point through the fourth low power transmission slot in the low power transmission period, receives data according to the transmission of the PS-poll (or trigger) frame from the access point, and transmits a response (i.e., ACK) frame according to the reception of the data to the access point.

After the low power transmission period, terminal 5 (STA 5) may transmit the PS-poll (or trigger) frame to the access point through the first channel access slot in the channel access period. Similarly, terminal 6 (STA 6) may transmit the PS-poll (or trigger) frame to the access point through the second channel access slot, and the terminal 7 (STA 7) may transmit the PS-poll (or trigger) frame to the access point through the third channel access slot.

Here, the channel access slot may have a length corresponding to "PS-poll (or trigger) frame transmission time+SIFS+ACK reception time". The length of the channel access slot is not limited thereto and may have various lengths according to settings.

The access point having received the PS-poll (or trigger) frame from each terminal may transmit the ACK frame corresponding to the PS-poll (or trigger) frame to the terminal. The ACK frame includes the data transmission slot allocation information for the terminal.

In other words, the access point may transmit the data transmission slot allocation information indicating that the first data transmission slot in the data transmission period is allocated to terminal 5 (STA 5) to terminal 5 (SAT 5) through the ACK frame, and may transmit the data transmission slot allocation information indicating that the second data transmission slot in the data transmission period is allocated to terminal 7 (STA 7) to terminal 7 (STA 7) through the ACK frame. In this case, since terminal 6 (STA 6) has not transmitted the PS-poll (or trigger) frame to the access point, the access point does not transmit the data transmission slot allocation information for terminal 6 (STA 6).

Here, the data transmission slot may have a length corresponding to "data reception time+SIFS+ACK transmission time". The length of the data transmission slot is not limited thereto and may have various lengths according to settings.

After the channel access period, terminal 5 (STA 5) receives the data from the access point through the first data transmission slot in the data transmission period based on the data transmission slot allocation information, and transmits the ACK frame according to the reception of the data to the access point. Terminal 7 (STA 7) receives the data from the access point through the second data transmission slot in the data transmission period based on the data transmission slot allocation information and transmits an ACK frame according to the reception of the data to the access point.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

SEQUENCE LIST TEXT

10: access point (AP)
20: terminal (STA)

What is claimed is:

1. A method for channel access by a terminal in a wireless local area network, the method comprising:
   transmitting, to an access point, an association request frame;
   receiving, from the access point, an association response frame to establish an association between the terminal and the access point, wherein the association response frame includes information indicating an association identifier (AID), wherein the association response frame specifies a length of a channel access slot associated with the terminal;
   receiving, from the access point, a beacon frame including Traffic Indication Map (TIM) information and information assigning channel access windows, wherein one of the channel access windows is assigned as a trigger frame channel access window;
   transmitting, to the access point, a trigger frame in a slot allocated to the terminal within the trigger frame channel access window, the slot allocated to the terminal being determined based on the TIM information and the AID; and
   receiving, from the access point, in response to the trigger frame, an acknowledgement (ACK) frame specifying a timeslot allocated individually to the terminal to start a data transmission and a length of the specified data transmission timeslot, wherein the specified data transmission timeslot is one of a plurality of timeslots within a predetermined period after a certain time, and wherein the length of the specified data transmission timeslot comprises the length in which data can be received.

2. The method according to claim 1, wherein the slot allocated to the terminal is determined based on a position of the AID of the terminal included in the TIM information.

3. The method according to claim 1, further comprising receiving a data frame from the access point during the data transmission.

4. A method for supporting channel access of a terminal by an access point in a wireless local area network, the method comprising:
   receiving, from the terminal, an association request frame;
   transmitting, to the terminal, an association response frame to establish an association between the terminal and the access point, wherein the association response frame includes information indicating an association identifier (AID), wherein the association response frame specifies a length of a channel access slot associated with the terminal;
   transmitting a beacon frame including Traffic Indication Map (TIM) information and information assigning channel access windows, wherein one of the channel access windows is assigned as a trigger frame channel access window;
   receiving a trigger frame from the terminal in a slot allocated to the terminal within the trigger frame channel access window, the slot allocated to the terminal being determined based on the TIM information and the AID; and
   transmitting, to the terminal, in response to the trigger frame, an acknowledgement (ACK) frame specifying a timeslot allocated individually to the terminal to start a data transmission and a length of the specified data transmission timeslot, wherein the specified data transmission timeslot is one of a plurality of timeslots within a predetermined period after a certain time, and wherein the length of the specified data transmission timeslot comprises the length in which data can be received.

5. The method according to claim 4, wherein the slot allocated to the terminal is determined based on a position of the AID of the terminal included in the TIM information.

6. The method according to claim 4, further comprising receiving data frame from the access point during the data transmission.

7. A terminal for performing channel access, the terminal comprising:
   a transceiver; and
   a processor,
   wherein the processor is configured to:
   transmit, to an access point, an association request frame;
   receive, from the access point, an association response frame to establish an association between the terminal and the access point, wherein the association response frame includes information indicating an association identifier (AID), wherein the association response frame specifies a length of a channel access slot associated with the terminal;
   receive, from the access point, a beacon frame including Traffic Indication Map (TIM) information and information assigning channel access windows, wherein one of the channel access windows is assigned as a trigger frame channel access window:
   transmit, to the access point, a trigger frame in a slot allocated to the terminal within the trigger frame channel access window, the slot allocated to the terminal being determined based on the TIM information and the AID; and
   receive, from the access point, in response to the trigger frame, an acknowledgement (ACK) frame specifying a timeslot allocated individually to the terminal to start a data transmission and a length of the specified data transmission timeslot, wherein the specified data transmission timeslot is one of a plurality of timeslots within a predetermined period after a certain time, and wherein the length of the specified data transmission timeslot comprises the length in which data can be received.

8. An access point for supporting channel access of a terminal, the access point comprising: a transceiver; and a processor,
   wherein the processor is configured to:
   receive, from the terminal, an association request frame;
   transmit, to the terminal, an association response frame to establish an association between the terminal and the access point, wherein the association response frame includes information indicating an association identifier (AID), wherein the association response frame specifies a length of a channel access slot associated with the terminal;
   transmit a beacon frame including Traffic Indication Map (TIM) information and information assigning channel access windows, wherein one of the channel access windows is assigned as a trigger frame channel access window:
   receive a trigger frame from the terminal in a slot allocated to the terminal within the trigger frame channel access window, the slot allocated to the terminal being determined based on the TIM information and the AID; and
   transmit, to the terminal, in response to the trigger frame, an acknowledgement (ACK) frame specifying a timeslot allocated individually to the terminal to start a data transmission and a length of the specified data transmission timeslot, wherein the specified data transmission timeslot is one of a plurality of timeslots within a predetermined period after a certain time, and wherein the length of the specified data transmission timeslot comprises the length in which data can be received.

9. A non-transitory computer machine-readable storage medium storing instructions that cause a processing device to perform operations for channel access by a terminal in a wireless local area network, the operations comprising:

transmitting, to an access point, an association request frame;

receiving, from the access point, an association response frame to establish an association between the terminal and the access point, wherein the association response frame includes information indicating an association identifier (AID), wherein the association response frame specifies a length of a channel access slot associated with the terminal;

receiving, from the access point, a beacon frame including Traffic Indication Map (TIM) information and information assigning channel access windows, wherein one of the channel access windows is assigned as a trigger frame channel access window;

transmitting, to the access point, a trigger frame in a slot allocated to the terminal within the trigger frame channel access window, the slot allocated to the terminal being determined based on the TIM information and the AID; and     receiving, from the access point, in response to the trigger frame, an acknowledgement (ACK) frame specifying a timeslot allocated individually to the terminal to start a data transmission and a length of the specified data transmission timeslot, wherein the specified data transmission timeslot is one of a plurality of timeslots within a predetermined period after a certain time, and wherein the length of the specified data transmission timeslot comprises the length in which data can be received.

10. The non-transitory computer machine-readable storage medium of claim 9, wherein the slot allocated to the terminal is determined based on a position of the AID of the terminal included in the TIM information.

11. The non-transitory computer machine-readable storage medium of claim 9, further comprising receiving a data frame from the access point during the data transmission.

12. A non-transitory computer machine-readable storage medium storing instructions that cause a processing device to perform operations for supporting channel access of a terminal by an access point in a wireless local area network, the operations comprising:

receiving, from the terminal, an association request frame;

transmitting, to the terminal, an association response frame to establish an association between the terminal and the access point, wherein the association response frame includes information indicating an association identifier (AID), wherein the association response frame specifies a length of a channel access slot associated with the terminal;

transmitting a beacon frame including Traffic Indication Map (TIM) information and information assigning channel access windows, wherein one of the channel access windows is assigned as a trigger frame channel access window;

receiving a trigger frame from the terminal in a slot allocated to the terminal within the trigger frame channel access window, the slot allocated to the terminal being determined based on the TIM information and the AID; and     transmitting, to the terminal, in response to the trigger frame, an acknowledgement (ACK) frame specifying a timeslot allocated individually to the terminal to start a data transmission and a length of the specified data transmission timeslot, wherein the specified data transmission timeslot is one of a plurality of timeslots within a predetermined period after a certain time, and wherein the length of the specified data transmission timeslot comprises the length in which data can be received.

13. The non-transitory computer machine-readable storage medium of claim 12, wherein the slot allocated to the terminal is determined based on a position of the AID of the terminal included in the TIM information.

14. The non-transitory computer machine-readable storage medium of claim 12, wherein the processing device further comprises receiving data frame from the access point during the data transmission.

\* \* \* \* \*